United States Patent [19]

Miyatsuka

[11] Patent Number: 4,555,431
[45] Date of Patent: Nov. 26, 1985

[54] MAGNETIC RECORDING MEDIUM

[75] Inventor: Hajime Miyatsuka, Odawara, Japan

[73] Assignee: Fuji Photo Film Co., Ltd., Minami-ashigara, Japan

[21] Appl. No.: 576,990

[22] Filed: Feb. 6, 1984

[30] Foreign Application Priority Data

Feb. 4, 1983 [JP] Japan .................. 58-16243

[51] Int. Cl.$^4$ .............................. G11B 5/72
[52] U.S. Cl. .................. 428/141; 252/62.54;
360/134; 360/135; 360/136; 427/128; 427/131;
428/212; 428/323; 428/328; 428/329; 428/694;
428/695; 428/522; 428/425.9; 428/900
[58] Field of Search ............ 427/132, 128, 131;
428/694, 695, 904, 522, 425.9, 212, 141, 336,
328, 323, 329; 252/62.54; 360/134–136

[56] References Cited

U.S. PATENT DOCUMENTS

| | | | |
|---|---|---|---|
| 4,310,599 | 1/1982 | Akashi | 428/694 |
| 4,367,261 | 1/1983 | Miyoshi | 428/694 |
| 4,388,360 | 6/1983 | Miyoshi | 428/694 |
| 4,419,406 | 12/1983 | Isobe | 428/694 |
| 4,439,486 | 3/1984 | Yamada | 428/900 |
| 4,442,171 | 4/1984 | Sato | 428/900 |
| 4,450,199 | 5/1984 | Tadokoro | 428/694 |
| 4,452,863 | 6/1984 | Takizawa | 428/694 |
| 4,455,345 | 6/1984 | Miyatuka | 428/900 |
| 4,463,737 | 8/1984 | Miyatuka | 428/339 |

Primary Examiner—Ellis P. Robinson
Attorney, Agent, or Firm—Armstrong, Nikaido, Marmelstein & Kubovcik

[57] ABSTRACT

The tape running property of a magnetic recording medium is improved by provision a back layer. This magnetic recording medium comprises a magnetic layer on one side of a non-magnetic support and a back layer on the other side thereof, in which the magnetic layer consists mainly of a ferromagnetic metal powder and a binder and has a coercive force of at least 1000 Oe and a surface roughness of at most 0.03 μm, the ferromagnetic metal powder having a specific surface area of at least 35 m$^2$/gr and a saturation magnetization of at least 120 emu/gr, while the back layer has a surface electric resistance of at most $1 \times 10^{10} \Omega$ and a surface roughness of at most 0.05 μm.

18 Claims, 1 Drawing Figure

FIG. I
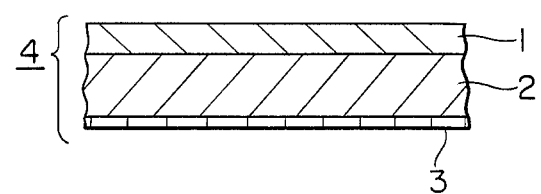

MAGNETIC RECORDING MEDIUM

BACKGROUND OF THE INVENTION

1. Field of the Invention

This invention relates to a magnetic recording medium and more particularly, it is concerned with a magnetic tape using a ferromagnetic metal powder, whose running property is improved without lowering S/N by the provision of a back layer.

2. Description of the Prior Art

As ferromagnetic powders, there are iron oxide type fine powders which have commonly been used, and ferromagnetic metal powders which have lately been used for the purpose of increasing the magnetic recording density as well as reproducing output due to their higher saturation magnetization and coercive force.

A magnetic recording tape using a ferromagnetic metal powder in a binder (so-called metal tape) is capable of giving a higher recording density than the iron oxide-type tape of the prior art and accordingly, its practical use as a video tape has lately been studied in real earnest. A trial device has been proposed in which VTR is subminiaturized by the use of such a metal tape and integrated with a camera. In this system the recording density is at least two times as much as that of the present VHS system or beta system and the diameter of a head cylinder and the head/tape relative speed are respectively reduced to about ½ of the present system. Accordingly, the recording wavelength is also reduced to half, i.e. at most 1 micron, approximately 0.6 micron.

Under these conditions, an image quality which compares favourably with the ordinary VHS/beta system is required for playback too. In assessment under the same conditions, therefore, a C/N ratio (playback signal output/modulation noise ratio in the case of recording FM carrier wave) of at least +6 is required for VHS/beta tapes. For satisfying these requirements, various conditions must be met and accordingly some problems arise.

That is, it is necessary to increase the coercive force (Hc) of a tape to some extent with shortening of recording wavelength. Moreover, it is desirable to hold the surface property as high as possible so as to reduce the spacing loss between a head and a base to the minimum. In order to improve the surface property of a magnetic layer, it is necessary to increase the dispersion of magnetic particles and to effect sufficient formation of the surface. This is effective for decreasing noise. Furthermore, it is more effective and important to decrease the particle size of magnetic particles. However, the decrease of particle size causes problems in that the surface electric resistance of a magnetic layer is increased and the potential of static charge of a tape during running in a VTR is raised, resulting in electric discharge and attraction of dusts being a cause of drop out. These problems tend to arise often under a low humidity and in particular, when a tape is fast forwarded or rewound.

As a non-magnetic support, there are commonly used plastic films such as polyethylene terephthalate films and polycarbonate films, but with the increase of recording density, a higher surface property is required on not only a magnetic layer side but also the back side thereof. If the surface property is upgraded, the friction coefficients with guide parts of a VTR, mechanical parts of a cassette and head cylinders are increased to lower the tape running property.

For the miniaturization of VTR, it has been necessary to make tapes thinner and accordingly, it has also been necessary to make thinner supports thereof. With the appearance of such thinner tapes, strength of the tape in the width direction is required such that breakage from the tape edge does not occur.

SUMMARY OF THE INVENTION

It is an object of the present invention to provide a magnetic recording medium with higher video characteristics.

It is another object of the present invention to provide a magnetic recording medium with a good running property and no operating troubles in VTR.

It is a further object of the present invention to provide a magnetic recording medium which causes no electric discharge due to static charge during running, nor increase of drop outs due to attraction of dusts.

It is a still further object of the present invention to provide a magnetic recording tape using a ferromagnetic metal powder and having an improved running property without lowering S/N.

These objects can be attained by a magnetic recording medium comprising a magnetic recording layer on one side of a non-magnetic support and a back layer on the other side thereof, in which the magnetic recording layer consists mainly of a ferromagnetic metal powder and a binder and has a coercive force of 1000 Oe or more and a surface roughness of 0.03μ or less, the ferromagnetic metal powder having a specific surface area of 35 m²/gr or more and a saturation magnetization ($\sigma_s$) of 120 emu/gr or more, while the back layer has a surface electric resistance of $1 \times 10^{10} \Omega$ or less and a surface roughness of 0.05μ or less.

BRIEF DESCRIPTION OF THE DRAWING

FIG. 1 is a cross-sectional view of a magnetic recording medium according to the present invention.

DETAILED DESCRIPTION OF THE INVENTION

The inventors have made efforts to overcome the disadvantages of the prior art and consequently, have found that the specific surface area of a ferromagnetic metal powder, measured by the N₂ gas adsorption method according to BET system, is a very important factor to improve the characteristics of the the recording medium. In order to achieve the object of the invention, it is required to use a ferromagnetic metal powder having a specific surface area of 35 m²/gr or more, preferably 40 m²/gr or more. That is, the surface property of a magnetic layer can be upgraded to lower the noise and to raise the C/N by the use of a magnetic powder with a larger specific surface and smaller particle size. In addition, the magnetic powder should have a saturation magnetization of 120 emu/gr or more, preferably 125 emu/gr or more. That is, a magnetic recording medium having a raised residual magnetization (Br) of the magnetic layer and a higher video sensitivity can be obtained by the use of a magnetic substance with a higher saturation magnetization.

Moreover, it is required that the coercive force (Hc) of a magnetic recording medium is 1000 Oe or more, preferably 1100 Oe or more, more preferably 1200 Oe or more. That is, various losses such as self-demagnetization and recording demagnetization with shortening of recording wavelength can be reduced to obtain a higher output by increasing somewhat the coercive force.

In order to reduce the spacing loss between a head and a magnetic recording medium to the minimum and to lower the noise, i.e. to increase the C/N, it is required that the surface roughness Ra of a magnetic layer is 0.03 μm or less. The surface roughness Ra herein described means that measured by the mean roughness on the central line of cutoff value 0.25 mm defined according to JIS-B 0601, 5th paragraph.

Preparation of a ferromagnetic metal powder used in the present invention is not particularly limited, but it can be prepared, for example, by the following methods:

(1) A method which comprises heat-decomposing an organic acid salt of a ferromagnetic metal and reducing it with a reducing gas.

(2) A method which comprises reducing a needle-like iron oxyhydroxide, which may contain other metals than iron, or a needle-like iron oxide derived from the oxyhydroxides (iron oxide reducing method).

(3) A method which comprises evaporating a ferromagnetic metal in an inert gas under a low pressure (vacuum evaporation method).

(4) A method which comprises heat-decomposing a metal carbonyl compound.

(5) A method which comprises electrodepositing a ferromagnetic metal powder using a mercury cathode and then separating the metal powder from mercury.

(6) A method which comprises reducing a solution containing a salt capable of forming a ferromagnetic substance with a reducing agent such as borohydrides, hypophosphites and hydrazine.

In the present invention, the ferromagnetic metal powders prepared by the above described methods (2), (3) and (6) are preferably used and above all, the powder obtained by the method (2) is the most preferable in view of the cost and quality. When a ferromagnetic metal powder of the present invention is prepared, it is desirable to form an oxide film on the particle surface in order to improve the chemical stability of the metal fine powder.

Generally, the ferromagnetic metal powder consists of pure iron or an alloy such as Fe—Ni or Fe—Ni—Co, to which a small quantity of at least one of non-magnetic elements and non-metallic elements such as B, C, N, Al, Si, P, S, Ti, Cr, Mn, Cu and Zn can be added so as to improve the properties. The particle size thereof cannot absolutely be defined, since the particles are in the form of a necklace of globular particles of several hundred Angstrom or in the form of a skeleton of needle-shaped particles.

The above described ferromagnetic powder is blended with a binder to obtain a magnetic coating composition.

Suitable binders which can be used in the present invention include hitherto known thermoplastic resins, thermosetting resins and mixtures thereof. Examples of these resins are vinyl chloride-vinyl acetate copolymers, various cellulose resins, acrylic resins, polyamide resins, butadiene type resins, urethane elastomers, isocyanate-hardened type resins and the like.

The mixing ratio by weight of the ferromagnetic metal powder and a binder is 8 to 25 parts of the binder to 100 parts of the ferromagnetic metal powder.

For the purpose of lowering the friction coefficient of a magnetic layer with VTR guide parts, head cylinder and cassette moving parts to ensure running, various fatty acids or fatty acid esters can be added to the magnetic coating composition.

Optionally, the magnetic coating composition can further include lubricants, for example, silicone oils such as polysiloxane; inorganic powders such as graphite, molybdenum disulfide and tungsten sulfide; plastic fine powders such as polyethylene, polypropylene and polytetrafluoroethylene; and fluorocarbons; abrasives such as fused alumina, silicon carbide, chromium oxide, corundum and diamond; and organic solvents, for example, ketones such as methyl ethyl ketone and cyclohexanone; alcohols; esters such as ethyl acetate and butyl acetate; aromatic solvents such as benzene, toluene and xylene; and chlorinated hydrocarbons such as carbon tetrachloride and chloroform.

As a non-magnetic support, there can be used synthetic resins such as polyesters, vinyl type polymers and cellulose type derivatives, non-magnetic metals and papers in the form of films, tapes and sheets.

In order to upgrade the magnetic properties such as S/N ratio, the magnetic layer coated on a support is subjected to a smoothening treatment, for example, a smoothening treatment before drying or a calendering treatment after drying.

The above described additives, supports and their production are described in Japanese Patent Publication No. 26890/1981.

Of the above described conditions for the production of a magnetic layer, in particular, the important points are to use a ferromagnetic metal powder with a large specific surface area and a small particle size and to prepare a coating composition well dispersed by dispersing this powder in a binder sufficiently. Thus, a high surface property magnetic layer with a surface roughness of 0.03 μm or less can be obtained.

The thickness of a magnetic layer is 4 μm or less, preferably 3 μm or less in the case of a high recording density of 1 μm or less in recording wavelength.

A ferromagnetic alloy powder with a large specific surface area is used so as to obtain a high C/N ratio, but it is found as a result of our experiments that when the specific surface area is increased, the surface electric resistance of a magnetic layer is increased, thus resulting in problems in that the static charge potential of a running tape in VTR is increased to cause discharge, sticking to a cylinder or attracting dusts and increase of drop outs.

Of course, electrically conductive particles such as of carbon black or graphite can be added to a magnetic layer to decrease the electric resistance thereof, but in this case, there arises a problem in that Br is lowered and the object of the present invention to obtain good video characteristics cannot be attained. The surface electric resistance of a magnetic layer, which does not meet with such problems in practical use, is $1 \times 10^9 \Omega$ or less, preferably $1 \times 10^8 \Omega$ or less.

Based on our knowledge that these problems can be solved by provision of a back layer with a low electric resistance, we have made experiments and consequently, have found that when a magnetic powder has a specific surface area of 30 $m^2/gr$ or more, the back layer should have a surface electric resistance of $10^{10} \Omega$ or less.

Such a back layer is formed by mixing and dispersing a pigment and a binder to prepare a coating composition, followed by coating. As the pigment, carbon black or graphite is preferably used to adjust the surface electric resistance to $10^{10} \Omega$ or less, but in addition, inorganic powders such as tungsten disulfide, molybdenum disulfide, boron nitride, $SiO_2$, $CaCO_3$, $Al_2O_3$, $Fe_2O_3$, $TiO_2$, MnO, ZnO and CaO can also be used. The proportion of the pigment is 1 to 4 parts by weight, preferably 2 to 3 parts by weight to part of the binder by weight. The particle size of the pigment is generally 100 μm or less, preferably 60 μm or less, more preferably 30 μm or less to obtain a surface roughness of 0.05 μm or less. Furthermore, it is important to effect sufficiently blending and dispersing of a pigment and a binder to raise the dispersion of the pigment. As the binder, there can be used various thermoplastic resins and thermosetting resins, which are substantially similar to those used for the magnetic layer. The thickness of the back layer is generally 3 μm or less, preferably 0.5 to 2 μm.

In order to achieve the object of the present invention, a suitable surface roughness of the back layer is also important similarly to that of the magnetic layer. That is, if the surface roughness of the back layer is large, the roughness is transferred to the magnetic layer to increase the surface roughness of the magnetic layer and to lower the C/N ratio. As a result of studying various combinations of the surface roughness of magnetic layers and back layers, it is found that the surface roughness of the back layer should be 0.05 μm or less so as to hold the surface roughness of the magnetic layer below 0.03 μm.

That is to say, in accordance with the present invention, there is provided a magnetic recording medium comprising a magnetic layer on one side of a non-magnetic support and a back layer on the other side thereof, in which the magnetic layer consists mainly of a ferromagnetic metal powder and a binder and has a coercive force (Hc) of 1000 Oe or more and a surface roughness Ra of 0.03 μm or less in the case of a tape, the ferromagnetic metal powder having a specific surface area of 35 m$^2$/gr or more and a saturation magnetization of 120 emu/gr or more, while the back layer has a surface roughness Ra of 0.05 μm or less and a surface electric resistance of $10^{10}$ Ω or less.

Each of the characteristics of the present invention will now be illustrated in greater detail. The specific surface area of a ferromagnetic metal powder is preferably 35 to 150 m$^2$/gr, more preferably 40 to 100 m$^2$/gr, since if the specific surface area is larger than this range, the metal powder tends to be oxidized, resulting in marked deterioration of the tape with passage of time. The saturation magnetization σs of a ferromagnetic metal powder is preferably 120 to 180 emu/gr, more preferably 130 to 160 emu/gr, since if it is larger than this range, dispersion of the ferromagnetic metal powder is so difficult that a magnetic layer with a good surface property cannot be obtained.

The coercive force of a magnetic layer is preferably 1000 to 2500 Oe, more preferably 1200 to 2100 Oe, since if it is too large, erasure of the tape is difficult. The surface roughness of a magnetic layer is preferably 0.03 to 0.01 μm, since if it is too small, running of the tape is difficult.

The surface roughness of a back layer is preferably 0.05 to 0.02 μm, since if it is too small, problems arise in running of the tape.

FIG. 1 shows the structure of the magnetic recording medium 4 according to the present invention, in cross section, which comprises a magnetic layer 1 of a ferromagnetic powder and a binder, a non-magnetic support 2 and a back layer 3. In some cases, an undercoated layer can be provided between the magnetic layer 1 and support 2 so as to increase their adhesion thereof.

The present invention will be explained in detail with reference to the following examples. It will be obvious to one skilled in the art that various changes and modifications can be made in components, ratios, operational order and the like without departing from the spirit of the present invention. Therefore, the present invention should not be construed as being limited to the following examples. All parts, percents, ratios and the like are by weight unless otherwise indicated.

EXAMPLES AND COMPARATIVE EXAMPLES

Needle-shaped α—FeOOH containing 5% of cobalt was heat-decomposed to form α—Fe$_2$O$_3$ and then reduced with hydrogen to obtain a black ferromagnetic metal powder. Before taking this powder out of a furnace, the partial pressure of oxygen was gradually raised to effect a gradual oxidation. The thus obtained powder had magnetic properties and a specific surface area as shown in Table 1:

TABLE 1

| Ferromagnetic Metal Powder | Hc (Oe) | σs (emu/gr) | Specific Surface Area (m$^2$/gr) |
| --- | --- | --- | --- |
| A (Comparison) | 1400 | 115 | 38 |
| B (Our Invention) | 1430 | 125 | 45 |
| C (Our Invention) | 1350 | 135 | 40 |
| D (Comparison) | 1470 | 130 | 28 |
| E (Comparison) | 1050 | 128 | 35 |

Hc and σs of the ferromagnetic metal powders A–E were controlled by changing the particle size of α—FeOOH as a raw material and the condition of the gradual oxidation after the reduction.

300 parts of the above described ferromagnetic metal powder and the following composition were ball milled and dispersed for 10 hours:

| | |
| --- | --- |
| Polyester Polyurethane (reaction product of ethylene adipate and 2,4-tolylene diisocyanate, mean molecular weight corresponding to styrene: about 130 thousands) | 35 parts |
| Vinyl Chloride - Vinyl Acetate - Maleic Anhydride (maleic acid content: 3.0%, degree of polymerization; about 400) | 30 parts |
| α-Alumina | 15 parts |
| Carbon Black | 3 parts |
| Butyl Acetate | 300 parts |
| Methyl Isobutyl Ketone | 300 parts |

After the dispersion, fatty acids (oleic acid 3 parts and palmitic acid 3 parts) and fatty acid esters (amyl stearate 4 parts) were added thereto depending on Examples and further kneaded for 15 to 30 minutes. Furthermore, a 75% ethyl acetate solution of 22 parts of a triisocyanate compound (adduct of 3 moles of tolylene diisocyanate and 1 mole of trimethylolpropane (molecular weight: about 760; NCO content: 13.3%; commercial name: Desmodur L-75 manufactured by Bayer AG)) was added thereto and dispersed under high speed shearing for 1 hour to prepare a magnetic coating composition. The thus resulting coating composition was coated onto a polyethylene terephthalate film having a thickness of 14.5 μm to give a coating thickness of 3.0 μm on a dry basis, then subjected to an orientation treatment in a DC magnetic field, dried by feeding hot air at 100° C., subjected to a calendering treatment and slit in a width of ½ inch, thus obtaining a magnetic tape for video. The final thickness of the coating layer was 3.4 μm.

The magnetic properties were measured by means of a vibrating sample magnetometer (commercial name: "VSM-III Type" made by Toei Kogyo KK). The video property was a video output measured at 4 MHz using a VTR of VHS type (commercial name: "NV-8800" made by Matsushita Denki KK) whose recording and reproducing head had been remodeled with Sendust alloy. The standard tape was a tape for VHS "T 120 E" (made by Fuji Photo and Film Co.).

The magnetic property, surface roughness, surface electric resistance and video property of the resulting tapes are shown in Table 2:

TABLE 2

| Tape | Ferromagnetic Powder | Hc of Tape (Oe) | Br of Tape (Gauss) | Surface Roughness (μm) | Surface Electric Resistance (Ω) | Video Output (dB) | C/N (dB) |
|---|---|---|---|---|---|---|---|
| a* | A | 1290 | 2400 | 0.025 | $6 \times 10^9$ | +7 | +5.5 |
| b | B | 1310 | 2900 | 0.020 | $1.5 \times 10^{10}$ | +8 | +6.5 |
| c | C | 1240 | 3050 | 0.022 | $7 \times 10^9$ | +9.5 | +7.5 |
| d* | D | 1340 | 2950 | 0.030 | $3 \times 10^8$ | +8.5 | +5.5 |
| e* | E | 970 | 2800 | 0.025 | $5 \times 10^9$ | +6 | +5.0 |

Head: Sendust Head (track width: 50 μm; gap: 0.35 μm)
Surface Roughness: measured by the central line roughness of a cut-off value of 0.25 mm defined according to JIS - B0601, item 5
Video Output: Reproducing output of a signal of 4
MHz C/N: Ratio of an output of 4 MHz and a modulation noise level of 3 MHz when a carrier wave of 4 MHz is admitted
Surface Electric Resistance: measured by a superinsulation meter ("TR-8611 A" made by Takeda Riken Kogyo KK) in a room at 25° C. - 30% RH As is evident from the results of Table 2, with the increase of the specific surface area of a magnetic substance, the surface property and video property are upgraded, but the surface electric resistance is also increased. Unless σs is at least 120 emu/gr, a sufficient video property cannot be obtained. That is, each of Tapes b and c using the ferromagnetic metal powders B and C has good video property.

Tapes a–e were subjected to running in a VTR under a low humidity of 30% RH at 25° C. There was found no trouble in Tape d, but the other tapes met with discharge in the VTR when rewinding or fast forwarding. In the case of Tape b, in particular, this phenomenon was remarkable, and thus it is assumed that this phenomenon is related with the surface electric resistance.

The following composition and pigment were well mixed and dispersed in a ball mill to prepare a coating composition for a back layer:

| | |
|---|---|
| Nitrocellulose | 30 parts |
| Polyurethane (commercial name: Nipporan 2301 manufactured by Nippon Polyurethane KK) | 15 parts |
| Polyisocyanate (commercial name: Colonate L, manufactured by Nippon Polyurethane KK) | 25 parts |
| Methyl Ethyl Ketone | 1300 parts for Coating Composition F |
| | 1000 parts for Coating Composition G |
| | 800 parts for Coating Composition H |

The pigment was changed as shown in the following to prepare various coating compositions:

| | |
|---|---|
| Coating Composition F | 200 parts |
| Carbon Black (particle size: 30 μm) | |
| Coating Composition G | 100 parts |
| Carbon Black (particle size: 30 μm) | |
| Coating Composition H | 50 parts |
| Carbon Black (particle size: 30 μm) | |

Another ferromagnetic metal powder was provided having an Hc of 1400 Oe, σs of 130 emu/gr and specific surface area of 37 m²/gr. Under the same conditions, a tape was prepared having an Hc of 1280 Oe, Br of 3100 Gauss, surface roughness of 0.026 μm, surface electric resistance of $3 \times 10^9 \Omega$, video output of +9.0 dB and C/N of +7.5 dB. Discharge phenomenon was found when running in a VTR. When the back coating composition C was coated, the resulting tape had a video output of 9.0 dB and C/N ratio of +7.0 dB and met with no troubles when running in the VTR.

When there was no back layer, in many cases, the tape edges tend to be scratched after six runnings for 10 hours or longer, but when the back layer is provided, such a phenomenon hardly took place.

EXAMPLE 1

The back coating composition G was coated onto the back side of Tape c to give a coating thickness of 0.8 μm on a dry basis. The back layer showed a surface electric resistance of $6 \times 10^8 \Omega$ and a surface roughness of 0.045 μm. The surface roughness of the magnetic layer was somewhat increased to 0.025 μm. The video output was scarcely changed in comparison with the case of no back layer present, i.e. +9.5 dB and C/N was somewhat lowered, i.e. to +7.0 dB. When the tape was subjected to running in a VTR, there was found no discharge phenomenon unlike in the case of no back layer present.

EXAMPLE 2 (Comparison)

In Example 1, the coating composition H was coated to give a coating thickness of 0.9 μm on a dry basis. The back layer showed a surface electric resistance of $2 \times 10^{10} \Omega$ and a surface roughness of 0.03 μm. The surface roughness of the tape was not changed, i.e. 0.022 μm and the video output and C/N were not changed. However, the discharge phenomenon during running in VTR was held as it was. It is assumed that this phenomenon is due to the high surface electric resistance of the back layer.

EXAMPLE 3

The back coating composition G was coated onto the back side of Tape b to give a coating thickness of 1.0 μm on dry basis. The back layer showed a surface electric resistance of $8 \times 10^8 \Omega$ and a surface roughness of 0.047 μm. The surface roughness of the magnetic layer was considerably increased, i.e. to 0.025 μm and the video output and C/N were respectively changed to +7.5 dB and +6.0 dB. On the other hand, troubles during running in VTR, such as discharge phenomenon, did not take place.

EXAMPLE 4 (Comparison)

The back coating composition F was coated onto the back sides of Tapes b and c to obtain back layers having a surface electric resistance of $2 \times 10^7 \Omega$ to $3 \times 10^7 \Omega$ and a surface roughness of 0.055 μm to 0.050 μm. There was no trouble during running in VTR, but the surface roughness of the magnetic layers were 0.028 μm in the case of b and 0.031 μm in the case of c and the video output and C/N were considerably lowered, i.e. to +7 dB and +5.5 dB in the case of b and +8.0 dB and +5.5 dB in the case of c. It is evident from these results that the surface roughness of a back layer has large influences.

EXAMPLE 5

This example shows that all the limitations concerning the ferromagnetic metal powder, magnetic layer and back layer in the magnetic recording medium according to the present invention are essential. o shows the case of satisfying the condition of the present invention, while x shows the case of not satisfying it.

TABLE 3

| Magnetic Recording Medium | Magnetic Layer | | | | Back Layer | |
| --- | --- | --- | --- | --- | --- | --- |
| | Ferromagnetic Metal Magnetic Layer | | | | | |
| | Powder Specific Surface Area | $\sigma s$ | Hc | Surface Roughness | Electric Resistance | Surface Roughness |
| Example 1 | o | o | o | o | o | o |
| Tapes b and c (no back layer) | o | o | o | o | x | x |
| Example 2 | o | o | o | o | x | o |
| Example 5-1 | x | o | o | o | o | o |
| Example 5-2 | o | x | o | o | o | o |
| Example 5-3 | o | o | x | o | o | o |
| Example 5-4 | o | o | o | x | o | o |
| Example 5-5 | o | o | o | o | o | x |

As set forth before, Example 1 gives a good video output and C/N as well as excellent running property, while Tapes b and c (no back layer) and Example 2 have each a problem in running property.

Details of Examples 5-1 to 5-5 are described below:

EXAMPLE 5-1

Example 1 was repeated except for using Tape d instead of Tape c. The resulting tape did not have a video property better than that of Tape d in Table 2. Particularly, the noise was high due to the larger particle size and a good C/N was not obtained.

EXAMPLE 5-2

Example 1 was repeated except for using Tape a instead of Tape c. The resulting tape did not have a video property better than that of Tape a. Particularly, due to the smaller σs of Magnetic Substance A, Br of the tape was small and the sensitivity was not so high.

EXAMPLE 5-3

Example 1 was repeated except for using Tape e instead of Tape c. The resulting tape did not have a video property better than that of Tape e in Table 2. Particularly, the output was not so high due to the smaller Hc of Magnetic Substance E.

EXAMPLE 5-4

Example 1 was repeated except that the period of time for ball milling was 8 hours. The resulting magnetic layer showed a considerably coarse surface property, i.e. 0.035 μm. Thus, the video output and C/N were respectively +8.0 dB and +5.5 dB. Due to the larger surface roughness, the noise was large and C/N was lowered.

EXAMPLE 5-5

Example 1 was repeated except for changing the dispersing condition of the back coating composition G, thus obtaining a back layer with a surface electric resistance of $2 \times 10^9 \Omega$ and a surface roughness of 0.054 μm. The video output and C/N were considerably lowered, i.e. to +8.0 dB and +5.5 dB respectively.

EXAMPLE 6

Another ferromagnetic metal powder having an Hc of 1400 Oe, σs of 130 emu/gr and specific surface area of 37 m²/gr was prepared by the iron oxide reducing method analogous to the ferromagnetic metal powders A to E. Under the same conditions, a tape was prepared having an Hc of 1280 Oe, Br of 3100 Gauss, surface roughness of 0.026 μm, surface electric resistance of $3 \times 10^9 \Omega$, video output of +9.0 dB and C/N of +7.5 dB. During running in VTR, discharge phenomenon was found.

When the above described tape was coated with the back coating composition G, the video output and C/N were respectively +9.0 dB and +7.0 dB and there was no trouble during running in VTR.

In many cases, the tape having no back layer met with breakage of the tape edge after running for 10 hours or longer, while the tape having the back layer hardly met with such breakage.

What is claimed is:

1. A magnetic recording medium comprising a magnetic layer on one side of a non-magnetic support and a back layer on the other side thereof, in which the magnetic layer consists mainly of a ferromagnetic metal powder and a binder and has a coercive force of at least 1000 Oe and a surface roughness of at most 0.03 μm, the ferromagnetic powder having a specific surface area of at least 35 m²/gr and a saturation magnetization of at least 120 emu/gr, while the back layer has a surface electric resistance of at most $1 \times 10^{10} \Omega$ and a surface roughness of at most 0.05 μm.

2. The magnetic recording medium of claim 1, wherein the ferromagnetic metal powder is selected from the group consisting of powders of Fe, Fe—Ni and Fe—Ni—Co.

3. The magnetic recording medium of claim 2, wherein the ferromagnetic metal powder contains further a small amount of at least one element selected from the group consisting of B, C, N, Al, Si, P, S, Ti, Cr, Mn Cu and Zn.

4. The magnetic recording medium of claim 1, wherein the binder is selected from the group consisting of vinyl chloride-vinyl acetate copolymers, cellulosic resins, acrylic resins, polyamide resins, butadiene resins, urethane elastomers and isocyanate hardened type resins.

5. The magnetic recording medium of claim 1, wherein the ferromagnetic metal powder and binder are mixed in a proportion of 8 to 25 parts by weight of the binder to 100 parts by weight of the ferromagnetic metal powder.

6. The magnetic recording medium of claim 1, wherein the magnetic layer further contains at least one fatty acid or fatty acid ester.

7. The magnetic recording medium of claim 1, wherein the magnetic layer further contains at least one component selected from the group consisting of lubricants, abrasives and organic solvents.

8. The magnetic recording medium of claim 1, wherein the magnetic layer is subjected to a smoothening treatment.

9. The magnetic recording medium of claim 1, wherein the non-magnetic support is of a synthetic resin, non-magnetic metal or paper.

10. The magnetic recording medium of claim 9, wherein the non-magnetic support is in the form of a film, tape or sheet.

11. The magnetic recording medium of claim 1, wherein the magnetic layer has a thickness of at most 4 μm.

12. The magnetic recording medium of claim 1, wherein the back layer comprises a pigment and a binder.

13. The magnetic recording medium of claim 12, wherein the pigment is at least one member selected from the group consisting of carbon black, graphite, $WS_2$, $MoS_2$, BN, $SiO_2$, $CaCO_3$, $Al_2O_3$, $Fe_2O_3$, $TiO_2$, MnO, ZnO and CaO.

14. The magnetic recording medium of claim 12, wherein the pigment and binder are mixed in a proportion of 1 to 4 parts by weight of the pigment to one part by weight of the binder.

15. The magnetic recording medium of claim 12, wherein the pigment has a particle size of at most 100 μm.

16. The magnetic recording medium of claim 12, wherein the binder is selected from the group consisting of vinyl chloride-vinyl acetate copolymers, cellulosic resins, acrylic resins, polyamide resins, butadiene resins, urethane elastomers and isocyanate hardened type resins.

17. The magnetic recording medium of claim 1, wherein the back layer has a thickness of at most 3 μm.

18. The magnetic recording medium of claim 1, wherein an undercoated layer is provided between the magnetic layer and the non-magnetic support.

* * * * *

UNITED STATES PATENT AND TRADEMARK OFFICE
CERTIFICATE OF CORRECTION

PATENT NO. : 4,555,431
DATED : November 26, 1985
INVENTOR(S) : HAJIME MIYATSUKA ET AL It is certified that error appears in the above-identified patent and that said Letters Patent is hereby corrected as shown below:

On the cover page, Item [75] after "Japan" insert ---

Akira Kasuga, Odawara, Japan ---.

Signed and Sealed this

Twenty-fourth Day of June 1986

[SEAL]

Attest:

DONALD J. QUIGG

Attesting Officer     Commissioner of Patents and Trademarks